US006463461B1

(12) United States Patent
Hanson et al.

(10) Patent No.: US 6,463,461 B1
(45) Date of Patent: Oct. 8, 2002

(54) SYSTEM FOR COMMUNICATING INFORMATION AMONG A GROUP OF PARTICIPANTS

(75) Inventors: Mike Hanson, Menlo Park; Graham Miller; Brian Axe, both of San Francisco, all of CA (US)

(73) Assignee: Zaplet, Inc., Redwood Shores, CA (US)

(*) Notice: Subject to any disclaimer, the term of this patent is extended or adjusted under 35 U.S.C. 154(b) by 0 days.

(21) Appl. No.: 09/426,648

(22) Filed: Oct. 25, 1999

Related U.S. Application Data (60) Provisional application No. 60/151,650, filed on Aug. 31, 1999, and provisional application No. 60/151,476, filed on Aug. 30, 1999.

(51) Int. Cl.$^7$ ............................................... G06F 13/38
(52) U.S. Cl. ........................ 709/204; 709/205; 707/517
(58) Field of Search ................................. 709/243, 220, 709/221, 204, 205, 206; 705/10, 14, 25; 707/517

(56) References Cited

U.S. PATENT DOCUMENTS

| | | |
|---|---|---|
| 4,503,499 A | 3/1985 | Mason et al. |
| 4,567,600 A | 1/1986 | Massey et al. |
| 5,043,876 A | 8/1991 | Terry |
| 5,089,954 A | 2/1992 | Rago |
| 5,093,901 A | 3/1992 | Cree et al. |
| 5,093,918 A | 3/1992 | Heyen et al. ............... 709/223 |
| 5,129,057 A | 7/1992 | Strope et al. |
| 5,161,214 A | 11/1992 | Addink et al. |
| 5,245,532 A | 9/1993 | Mourier |
| 5,299,305 A | 3/1994 | Oomae et al. |
| 5,325,310 A | 6/1994 | Johnson et al. |
| 5,363,507 A | 11/1994 | Nakayama et al. |
| 5,377,354 A | 12/1994 | Scannell et al. |
| 5,392,400 A | 2/1995 | Berkowitz et al. |
| 5,408,470 A | 4/1995 | Rothrock et al. |
| 5,410,646 A | 4/1995 | Tondevold et al. |

(List continued on next page.)

FOREIGN PATENT DOCUMENTS

| | | |
|---|---|---|
| EP | 0 739 115 A2 | 10/1996 |
| EP | 1085444 A2 | 3/2001 |

OTHER PUBLICATIONS

"Lotus Notes 5 Releasestep by Step, A Beginner's Guide to Lotus Notes," 1995–1999, pp. 1–228.

"Quick Courses in Microsoft Outlook 2000," Microsoft Press, Online Press Inc., 1999, pp. 1–148.

Goldberg et al., *Active Mail—A Framework for Implementing Groupware* CSWC Proceedings Nov. 1992: 75–83.

Brothers et al., *Supporting Informal Communication Via Ephemeral Interest Groups* CSWC Proceedings Nov. 1992: 84–90.

Borenstein, Nathaniel S., *Computational Mail as Network Infrastructure for Computer–Supported Cooperative Work* CSWC Proceedings Nov. 1992: 67–74.

*Primary Examiner*—Ayaz Sheikh
*Assistant Examiner*—Khanh Quang Dinh
(74) *Attorney, Agent, or Firm*—Christopher J. Palermo; Hickman Palermo Truong & Becker LLP (57) ABSTRACT

A system is described that can be used to communicate information among a group of participants. A participant may create an electronic form specifying a list of network addresses corresponding to other participants intended to receive the communication. A server receives the form and delivers a message associated with an electronic medium. When the participant opens the message, the electronic medium is produced by the server and includes static and dynamic content. The participant can add content to the dynamic content. The dynamic content regions can be asynchronously dynamically updated in the server to indicate a then current content of the electronic medium, and can be accessed by other participants in the group.

44 Claims, 4 Drawing Sheets

U.S. PATENT DOCUMENTS

| | | | |
|---|---|---|---|
| 5,418,908 A | 5/1995 | Keller et al. ................. 709/218 |
| 5,428,784 A | 6/1995 | Cahill, Jr. |
| 5,535,332 A | 7/1996 | Ishida |
| 5,537,142 A | 7/1996 | Fenouil ....................... 707/517 |
| 5,555,426 A | 9/1996 | Johnson et al. |
| 5,557,723 A | 9/1996 | Holt et al. ................... 709/232 |
| 5,592,626 A | 1/1997 | Papadimitriou et al. ...... 707/10 |
| 5,602,841 A | 2/1997 | Lebizay et al. ............... 707/10 |
| 5,608,872 A | 3/1997 | Schwartz et al. ........... 709/205 |
| 5,617,539 A | 4/1997 | Ludwig et al. |
| 5,632,018 A | 5/1997 | Otorii |
| 5,647,002 A | 7/1997 | Brunson |
| 5,664,207 A | 9/1997 | Crumpler et al. |
| 5,687,317 A | 11/1997 | Hughes et al. |
| 5,692,125 A | 11/1997 | Schloss et al. .............. 709/226 |
| 5,744,670 A | 4/1998 | Motoyuki et al. .......... 585/320 |
| 5,757,669 A | 5/1998 | Christie et al. |
| 5,781,732 A | 7/1998 | Adams |
| 5,796,396 A | 8/1998 | Rich |
| 5,799,191 A | 8/1998 | Moriyasu et al. |
| 5,799,320 A | 8/1998 | Klug |
| 5,819,032 A | 10/1998 | de Vries et al. ............ 709/220 |
| 5,819,092 A * | 10/1998 | Ferguson et al. ........... 709/201 |
| 5,819,274 A | 10/1998 | Jackson, Jr. |
| 5,821,925 A | 10/1998 | Carey et al. |
| 5,825,883 A | 10/1998 | Archibald et al. |
| 5,826,242 A | 10/1998 | Montulli ...................... 705/27 |
| 5,835,713 A | 11/1998 | Fitzpatrick et al. |
| 5,848,396 A | 12/1998 | Gerace ........................ 705/10 |
| 5,850,517 A | 12/1998 | Verkler et al. |
| 5,855,020 A | 12/1998 | Kirsch |
| 5,862,330 A | 1/1999 | Anupam et al. ............ 709/202 |
| 5,872,924 A | 2/1999 | Nakayama et al. |
| 5,884,035 A | 3/1999 | Butman et al. |
| 5,884,325 A | 3/1999 | Bauer et al. |
| 5,892,761 A | 4/1999 | Stracke, Jr. ................. 370/395 |
| 5,897,622 A | 4/1999 | Blinn et al. |
| 5,909,689 A | 6/1999 | Van Ryzin |
| 5,911,045 A | 6/1999 | Leyba et al. |
| 5,913,040 A | 6/1999 | Rakavy et al. |
| 5,913,920 A | 6/1999 | Adams et al. |
| 5,918,054 A * | 6/1999 | Jury et al. ................... 710/200 |
| 5,923,848 A | 7/1999 | Goodhand et al. .......... 709/219 |
| 5,930,471 A | 7/1999 | Milewski et al. |
| 5,933,811 A | 8/1999 | Angles et al. ................ 705/14 |
| 5,937,161 A | 8/1999 | Mulligan et al. |
| 5,944,785 A | 8/1999 | Pommier et al. |
| 5,945,989 A | 8/1999 | Freishtat et al. |
| 5,948,057 A | 9/1999 | Berger et al. |
| 5,948,070 A | 9/1999 | Fujita ......................... 709/243 |
| 5,951,652 A | 9/1999 | Ingrassia, Jr. et al. ...... 709/248 |
| 5,960,404 A | 9/1999 | Chaar et al. ................... 705/8 |
| 5,963,947 A | 10/1999 | Ford et al. ..................... 707/10 |
| 5,966,512 A | 10/1999 | Bates et al. |
| 5,974,430 A * | 10/1999 | Mutschler et al. .......... 707/505 |
| 5,987,376 A | 11/1999 | Olson et al. |
| 5,995,096 A | 11/1999 | Kitahara et al. |
| 5,995,097 A | 11/1999 | Tokumine et al. |
| 6,009,410 A | 12/1999 | LeMole et al. ............... 705/14 |
| 6,012,083 A | 1/2000 | Savitzky et al. |
| 6,012,090 A | 1/2000 | Chung et al. |
| 6,014,502 A | 1/2000 | Moraes |
| 6,025,841 A | 2/2000 | Finkelstein et al. ......... 345/342 |
| 6,044,403 A | 3/2000 | Gerszberg et al. |
| 6,047,311 A | 4/2000 | Ueno et al. .................. 709/202 |
| 6,055,522 A | 4/2000 | Krishna et al. ............. 707/517 |
| 6,084,883 A | 7/2000 | Norrell et al. ................. 707/3 |
| 6,092,074 A | 7/2000 | Rodkin et al. |
| 6,105,055 A | 8/2000 | Pizano et al. ............... 709/204 |
| 6,115,384 A | 9/2000 | Parzych |
| 6,134,582 A | 10/2000 | Kennedy ..................... 709/206 |
| 6,141,010 A | 10/2000 | Hoyle ......................... 707/517 |
| 6,155,840 A | 12/2000 | Sallette ....................... 434/323 |
| 6,161,137 A | 12/2000 | Ogdon et al. ............... 709/224 |
| 6,161,149 A | 12/2000 | Achacoso et al. ............. 710/4 |
| 6,173,316 B1 | 1/2001 | De Boor et al. ............ 709/218 |
| 6,182,052 B1 * | 1/2001 | Fulton et al. ................. 705/26 |
| 6,185,602 B1 | 2/2001 | Bayrakeri .................... 709/204 |
| 6,212,553 B1 | 4/2001 | Lee et al. .................... 709/206 |
| 6,219,054 B1 | 4/2001 | Komoda et al. ............ 345/353 |
| 6,230,156 B1 | 5/2001 | Hussey ......................... 707/10 |
| 6,230,185 B1 | 5/2001 | Salas et al. .................. 709/205 |
| 6,247,045 B1 | 6/2001 | Shaw et al. ................. 709/207 |
| 6,260,124 B1 | 7/2001 | Crockett et al. ............ 711/162 |

* cited by examiner

SYSTEM FOR COMMUNICATING INFORMATION AMONG A GROUP OF PARTICIPANTS

PROVISIONAL APPLICATION DATA

The present invention claims priority to U.S. Provisional Patent Application No. 60/151,650, filed Aug. 31, 1999 and No. 60/151,476, filed Aug. 30, 1999, both entitled SYSTEMS AND METHODS FOR MESSAGING WITH DYNAMIC CONTENT, naming inventors Michael Hanson, Graham Miller, and Brian Axe, and is incorporated by reference as if fully set forth herein.

CROSS-REFERENCE TO RELATED APPLICATIONS

The present application is related to co-pending U.S. patent applications entitled ELECTRONIC MEDIA FOR COMMUNICATING INFORMATION AMONG A GROUP OF PARTICIPANTS (patent pending), filed on the same day as the present application, application Ser. No. 09/427,378, invented by Hanson, Miller and Axe; and METHOD FOR COMMUNICATING INFORMATION AMONG A GROUP OF PARTICIPANTS, filed on the same day as the present application, application Ser. No. 09/427,152, invented by Hanson, Miller and Axe; and such applications are incorporated by reference herein as if fully set forth herein.

1. Technical Field

The present invention relates generally to communication networks, and more particularly, to a system and method for communicating information among a group of participants connected to such networks using a dynamic distribution of data.

2. Background of the Invention

Many applications are known that can be implemented to promote communication among members or participants in a group. For example, bulletin boards, news groups, and scheduling programs (e.g. Lotus Notes) each offer thread management and archiving functions for public and private consumption. Several of these applications can be accessed via computer networks, such as the Internet.

Each of these applications suffers from certain drawbacks. One such drawback is that most group applications require a user to locate the application by browsing the World Wide Web ("Web"), accessing a Universal Record Locator ("URL"), or other proprietary means. Consequently, the user must either have prior knowledge of the specific URL or navigate the Web. In the case of Web navigation, the member may access unwanted links to other web sites, when searching for the desired application. This tends to frustrate and confuse the member.

Another drawback to known application systems is that a member is required to use a proprietary client-server system. For example, to schedule a conference having many members using Lotus Notes or Outlook Exchange, each member of the group must be configured to use the specified client-server system. This is unduly burdensome and potentially expensive to the members of the group.

Group applications, such as a poll located on the Web, are also often unstructured. To accumulate answers to a poll, the question can be posted on a web site for members in the group to access and answer. However, any computer user with a web browser that can access the web site containing the question may also answer. In this way, unwanted answers are submitted, and the poll results tend to be inaccurate. Participation by unwanted users can be limited by implementing a security mechanism. Typically, this requires a member to complete tedious surveys, cumbersome biographical forms and annoying questionnaires, and also input possible confidential information.

Some applications can be integrated with Internet electronic mail ("e-mail") to also restrict the number of users to only specified recipients of the e-mail messages. However, current e-mail systems have several drawbacks. Known e-mail systems can only support static content messages. This means that the content of the e-mail message may become stale or outdated as members of the group consider the message and respond.

Using current e-mail systems, the user is also faced with the daunting task of sorting messages accumulated from group members. Once gathered together, the user must sift through the text of these messages, which is often duplicated. Additionally, content embedded in an e-mail, such as an attached file, is unnecessarily duplicated and stored on a number of mail servers. This wastes bandwidth and can cause bottlenecks in the network.

SUMMARY OF THE INVENTION

In general, the present invention is directed to a system for communicating information or collaborating among a group of participants in a group. The system includes a server that is configured to dynamically asynchronously update or retrieve dynamic content in an electronic medium that is served to selected participants in the group. The dynamic content of the electronic medium may be updated or dynamically retrieved based on input from any of the participants or from a variety of external sources. In this way, the dynamic content of the electronic medium is current when read by any of the participants in the group.

Accordingly, in one aspect, the present invention is directed to a network system for communicating information among participants of a group that includes a server having an associated database and adapted to be used in the network. The server may generate and send an electronic message to selected participants, and the server may generate and send an electronic medium stored in the database in response to a first open action of the electronic message by at least one of the selected participants. The electronic medium may include dynamic content. An interface in the electronic medium may be used to communicate input from the selected participants in the server, and logic in communication with the database may be used to asynchronously dynamically update and retrieve the dynamic content of the electronic medium stored in the database in response to input from the selected participants or an external source in data communication with the server.

Implementations of the invention may include one or more of the following. The database may include a plurality of variables associated with each of the participants, the electronic message, or the electronic medium. The server may be configured to support a variety of electronic mail protocols and a plurality of image construction languages. The network system may also be adapted to support an Internet protocol. The electronic medium may be parsed to access the dynamic content. The server may be configured to send a then current content of the electronic medium from the database in response to a second open action. The database may include a plurality of electronic forms that may be used to initiate the generation of the electronic message. The electronic form may include a region to enter a plurality of network addresses associated with any of the recipients receiving the electronic message. The network addresses may be accepted from a peripheral device. The updated dynamic content may be displayed in response to parsing the electronic message after the dynamic content is updated by the logic. The updated dynamic content may be enabled using a virtual image identifier that includes logic that maps the virtual image identifier to the dynamic content in the server. The updated dynamic content may be displayed using a tag associated with the Universal Record Locator of a web page stored in the server. The tag may include an IFRAME or an ILAYER tag. The dynamic content may include video content, audio content, binary content, text, executable content, or images. The dynamic content may be updated and retrieved dynamically asynchronously relative to the input from selected participants or from the external source in data communication with the server. The updated dynamic content may be current when accessed or retrieved from the server. The electronic message may include a code to identify a plurality of content-types.

In another aspect, the present invention is directed to a network system for supporting communication amongst participants of group including a server adapted to a network. A plurality of resources in the server are configured to generate an electronic medium in response to a first messaging action by one of the participants. Logic coupled to selected ones of the resources are configured for asynchronously dynamically updating content in the electronic medium in response to a second messaging action.

The details of one or more embodiments of the invention are set forth in the accompanying drawings and the description below. Other features, objects, and advantages of the invention will be apparent from the description and drawings, and from the claims.

DESCRIPTION OF THE PREFERRED EMBODIMENTS

In general, the present invention is directed to a method and system for communicating and collaborating among participants in a group. The method uses an electronic medium having at least one dynamic content region that is stored in a database of a server. Input composed by the participants of the group or other external sources is accepted by the server to update the dynamic content region of the electronic medium in the server. The updating of the dynamic content region is preferably performed asynchronously relative to the sending and receiving of the input from any of the participants or external sources. In this way, the content of the electronic medium is always current.

The invention is based on a principle different from known communication systems i.e. the information communicated between participants of the group is not current when sent by any participant, but current when accessed or read by a participant. The method and system of the invention does not merely rely on sending information that was current when the medium was sent to a receiving participant to communicate information; rather, the current content from the server of the electronic medium is retrieved, when the receiving participant accesses the electronic medium. This means that multiple virtual instances of the electronic medium can be reduced to a single thread. The method and system usefully reduces the amount of media, such as electronic mail messages carrying redundant static content that is communicated among the participants of the group. This invention also makes collaboration of information more rapid and interactive among participants of the group.

The electronic medium can also be updated by a variety of external sources, such as by an attached server containing stock quotes or news feeds. In this way, the electronic medium can be used to supply different types of information to the participant in a fast, efficient, and flexible manner.

A suitable system for the invention is a communication network that is configured with participants that support a variety of protocols, such as those for supporting electronic mail ("e-mail") and the Internet. The electronic media for communicating information and that supports collaboration among participants in a group connected to the network will be referred to as a "zaplet". The zaplet contains static content and dynamic content regions. The term dynamic content can be defined as regions of the zaplet that are retrieved from the server, when the zaplet is accessed by a participant or external source. The term static content can be defined as regions of the zaplet that are not retrieved at the time the zaplet is accessed by a participant or external source. The dynamic content of the zaplet can be changed and updated by the participants in the group or by other external sources, such as an external server containing the most recent news feeds or stock quotes. The content of the zaplet can be stored in a database in a server of the network. The zaplet is also customizable and programmable, containing various text and graphical regions to execute a variety of functions and applications. Preferably, each of the regions may be configured by the participants or the server in the network. When a participant performs an open action to access the zaplet, the zaplet may open and the server serves and displays the then current content in the database to a participant.

An "open action" can be defined as an action by any of the participants or the server that causes the static and/or the dynamic content of the zaplet to be retrieved from the server. For example, an open action may occur when a user invokes the File Open command from a menu bar within an email reading program while an email message containing a zaplet is selected. Alternatively, the server could perform an open action using, for example, push technology processes.

The term collaboration can be defined as an activity in which one or more participants or services share information or points-of-view with an intent of reaching a decision, making a choice, conducting a financial transaction, or sharing knowledge.

The dynamic content can be represented in a dynamic content region in the zaplet, and includes text or images, such as rich text HTML, based on mark-up languages or image construction languages. Consequently, the zaplet can supply all the look and feel possibilities of the World Wide Web ("Web"), and also the participants can experience interactions and collaborate with each other with increased efficiently than in known e-mail systems.

The system and method of the invention makes communication among a group of participants simple. Preferably, the server used to generate and manage the zaplet is scalable for a particular implementation. Its scalability allows quick user response under heavy load conditions on the server. Further, the zaplet can be easily accessed by the participant, such as from a desktop computer. Accordingly, the participant will have constant access to his or her zaplet at all times, and thereby can collaborate with other participants in the group quickly, simply, and efficiently. This means that the participant needs not repeatedly type-in the URL of a portal web site to regain access to a particular application, such as a discussion; the zaplet may be easily accessible and open in an unobtrusive manner.

Unless otherwise defined, all technical and scientific terms used herein have substantially the same meaning as commonly understood by one of ordinary skill in the art to which the invention belongs. Although many methods and systems similar or equivalent to those described herein can be used in the practice of the present invention, suitable methods and systems are described below. Additionally, the methods, systems, and examples described herein are illustrative only and not intended to be limiting.

Other features and advantages of the invention will be apparent from the following detailed description, the drawings, and from the claims.

Figure 1:
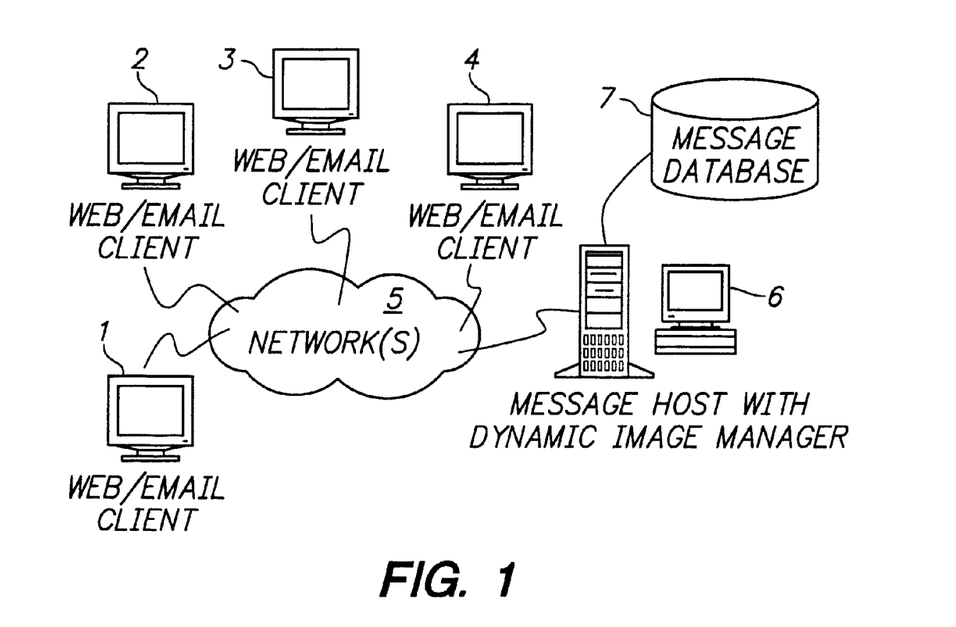
FIG. 1 is a simplified diagram of a sample network including participants of a group connected to the network.

FIG. 1 illustrates a plurality of participants 1, 2, 3, and 4 of a group that are coupled to a network 5. Any number of participants may be connected to the network 5. The term participant can be defined as an entity or system that is capable of performing or executing a variety of functions on the zaplet as described herein. For simplicity, however, the following description will be made to participants 1–4. Each of the participants 1–4 may include any specific or general computer system that is equipped to receive or read e-mail messages using standard e-mail protocols, such as the Simple Mail Transfer Protocol (SMTP) and the Multipurpose Internet Mail Extensions (MIME), or navigate the Web. The computer may be, for example, a personal computer ("P.C."), an Apple Macintosh, a Unix workstation, or other computing machine that runs a windows-based operating system. A suitable computer may also include a modem, a monitor, a keyboard, a mouse, system software including support for TCP/IP communication, and browser software. Alternatively, the participants 1–4 may include other devices that are capable of transmitting or receiving e-mail messages, forms, or zaplets, such as Palm computers provided by 3Com Corporation, Windows CE-based devices, messaging enabled cellular telephones, pagers, television set top boxes, e.g., Web T.V., or portable computers. The participants 1–4 may further include other devices that are capable of processing text or voice messaging.

The network 5 may be any local or global computer network. For example, the network 5 may be the Internet, a telephone network, a wireless communications network, a satellite communications network, or other similar data networks.

For simplicity, the following description will be made using a system and method configured to support any of the below listed e-mail protocols and data structures. However, the invention can be configured and practiced in any of the above communication networks. For example, voicemail using interactive voice systems could be configured to provide voice messages as current when heard dynamic content.

Each of the participants 1–4 is configured to support a variety of e-mail protocols and mark-up languages, such as SMTP, MIME, Hypertext Mark-up Language ("HTML"), Extensible Mark-up Language ("XML"), Standardized Generalized Mark-up Language ("SGML"), or similar e-mail protocols and/or mark-up languages.

FIG. 1 also shows a server 6 that is connected to the network 5. The server 6 is preferably configured to manage the dynamic content, routing, and updating of electronic forms, messages, or zaplets among the participants 1–4. The server 6 is connected to a message database 7 that is used to manage the dynamic content of zaplets in accordance with the present invention. Other data management resources may also be used.

Figure 2:
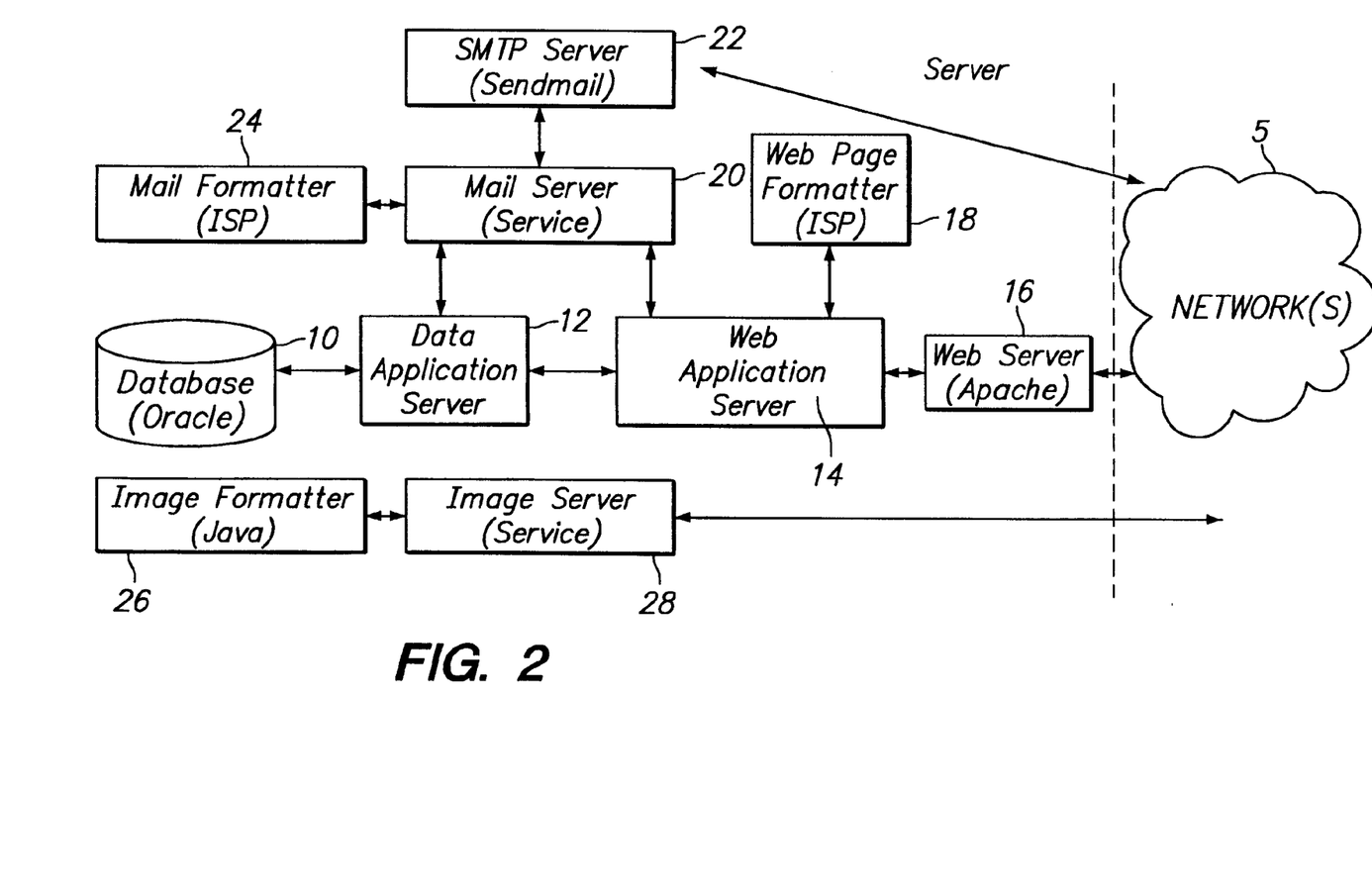
FIG. 2 illustrates a schematic diagram showing data flows of functional components of the network of FIG. 1.

FIG. 2 illustrates a simplified block diagram showing data flows of various functional components of the server 6. The server 6 includes a database 10. The database 10 may be a relational database, such as commercially available from Oracle. The database 10 may include multiple physical databases and may be implemented at a single site or distributed among many sites. The database 10 may also be implemented using object-oriented databases, object-relational databases, or hierarchical file structures.

The database 10 may include information that is specific to any participant or electronic form, message, or zaplet. Contents of the database 10 may include demographic data, participant credit card and payment information, participant preference information, generic form, message, or zaplet information, such as recipients or senders of the group, subject identifiers, or message specific information, and usage statistics for the electronic forms, messages, and zaplets and/or a web site. The database 10 may also store electronic forms that act as blanks for the creation of the zaplets. The database 10 may also include images and web pages used in the creation of the zaplets and also used in the presentation of any dynamic region of the zaplet. The database 10 may also maintain a record of the history of changes that have been made to any dynamic content region of the zaplet discussed below. This record may also be propagated along with any dynamic content to one of the participants parsing the electronic message and zaplet, as discussed below. An example configuration for storing and processing various content in the database 10 is illustrated in the attached Appendix A, which is herein incorporated by reference.

FIG. 2 also shows a data application server 12 is coupled to the database 10. The server 12 is configured with, for example, a set of Java classes or any other high level programming language built using, for example, an Enhydra application server or any of a variety of other tools for object-relational translation. The data application server 12 is used for translating the content in the database 10 into Java objects, for use by a web application server 14. The data application server 12 may also be configured to cache some data to reduce the load on the database 10.

A web server 16 is included in the server 6 to connect to the participants 1–4. is connected to the web application server 14 and can be any commercially available web server, such as an Apache server. The web server 16 is configured to manage requests from browsers at the participants 1–4, to manage session information, to send and receive forms, or zaplets transmitted to or from the participants 1–4, and to serve HTML data and static images to the participants 1–4.

The web application server 14 can be configured using a set of Java classes built-on top of the data application server 12. The web application server 14 is responsible for executing business logic associated with the electronic forms, messages, and zaplets. For example, the web application server 14 may manage message, form, and zaplet manipulation, deadlocks in the network 5, generate a URL and content associated with a specific zaplet or form, format the zaplet, message, or form, handle message authorizing, and handle participant record editing and participant interaction with various zaplets, forms, and messages.

A web page formatter 18 is connected to the web application server 14. The web page formatter 18 is used to handle the basic styles and layouts of various components of the zaplets, messages, or forms. Further details of the preferred business logic configured in pseudocode executable by the system and describing the method of the present invention for initiating, sending, updating and displaying the zaplet, forms, and messages can be found in attached Appendix A.

The web page formatter 18 may be configured to operate using a Java Server Page ("JSP") construct.

FIG. 2 also shows that the server 5 includes a mail server 20 coupled to the web application server 14 and the data application server 12. The mail server 20 handles the operations of the e-mail protocol necessary to support a variety of zaplets, forms, and messages. For a given message, form, or zaplet, the mail server 20 retrieves data associated with the medium from the data application server 12, and from any operations of the business logic of the web application server 14. The mail server 20 then formats the static content for the medium utilizing an associated mail formatter 24 including a command to retrieve the dynamic content. The mail formatter 24 includes operations that can be used for the basic styles and layouts of the common elements of the zaplets, forms, or messages. Once the mail server 20 has compiled the required information from the data application server 12 and web application server 14, the mail server 20 may attach necessary header information to the zaplet, form, or message. For example, the header information may make an e-mail message compliant with the MIME standard. The mail server 20 then transmits the produced message to a mail transport server 22. The mail transport server 22 routes the message through the network 5. The mail server 20 may also be configured to manage bounced and undelivered messages, forms, or zaplets, and also alert the appropriate participants of these conditions. The mail server 20 may also communicate with the web application server to validate the addresses of the various participants. The mail server 20 may also receive responses via the interaction region 225 discussed below from any participant who is not connected to the network 10 or "off-line" when reading the zaplet. In this configuration, the participant can send input back to the server 6 to be dynamically updated, after he or she is reconnected to the network 10. In this way, the participant can contribute to a zaplet even in the absence of the dynamic content and without having to get back to the zaplet when connected "on-line".

The mail formatter 24 may be implemented using a JSP construct.

The mail transport server 22 may use SMTP, and can be implemented using a number of commercially available or open source e-mail servers, including Sendmail and the Exchange server.

The server 6 also includes an image server 28 that is used for connection to the participants 1–4. An image formatter 26 is connected to the image server 28. The image server 28 may be implemented using a web server (servlet). The image server 28 takes information from Hypertext Transfer Protocol ("HTTP") requests from the participants 1–4 and translates the information using predefined schemes into human viewable images that are encoded in a format compatible with known web browsers. The image server 28 may be configured separately from the web server 16, as shown in FIG. 2. This configuration may increase the scalability of the server 6. Alternatively, the web server 16 and the image server 28 can be configured together. The image formatter 28 may be configured using a Java construct. The image formatter 28 formats the image into a compliant standard, such as Graphical Interchange Format ("GIF"), Joint Photographics Experts Group ("JPEG"), or Portable Network Graphics ("PNG"), for the participants 1–4.

Figure 3:
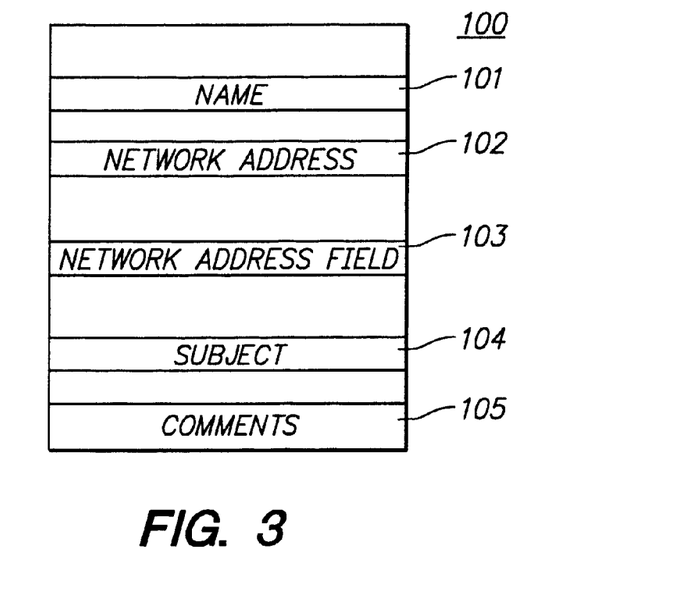
FIG. 3 illustrates an example electronic form to initiate a zaplet.

FIG. 3 illustrates an exemplary electronic form 100 that can be used to compose and initiate a zaplet among the participants 1–4 in accordance with the invention. The electronic form may be, for example, an HTML form. The electronic form 100 can be accessed via a web site sent by the server 6 to the participants 1–4, or may reside as a template at the participants 1–4.

The electronic form 100 can be stored in database 10, reside on a device of a participant, such as in a memory of a computer, or can be sent to a participant via a communications protocol, such as e-mail. The electronic form 100 may be blank or partially completed. To partially complete the form, the server 6 may contain prior knowledge of the use of the form using, for example, "cookies" or other suitable techniques.

The electronic form 100 includes a name field 101 that specifies the creating participant's name and a network address field 102 that specifies a specific address associated with the creating participant, such as an e-mail address. The electronic form 100 can also include a network address field 103 that includes network addresses of the participants that should receive the zaplet. The list of network addresses in the field 103 may include the network address of the creating participant. The list of network addresses may be explicitly inputted by the creating participant using a keyboard, imported from a folder or other file residing at the creating participant, or imported by the creating participant from a peripheral device, such as a Palm Pilot provided by 3Com. Alternatively, the creating participant can provide the list of network addresses to the server 6. In this configuration, the server 6 may input the list of network addresses into the field 103, when the creating participant accesses the electronic form 100, as described below. This means that the field 103 will be completed for the creating participant, when the electronic form 100 is accessed. At this stage, the creating participant may add or delete network addresses from the list provided by the server 6.

The electronic form 100 may also include a subject field 104 and any number of question, choice or comment fields 105. The creating participant may describe the subject matter of the zaplet in the subject filed 104 and supply details regarding the zaplet, in the comment field 105. In one configuration, each of the fields 101, 102, 103, 104, and 105 are part of a static region. The electronic form 100 may also include other applicable fields, such as for a title of the zaplet, fields for soliciting information from the participant, such as his/her address, links to other zaplets, a description field to receive an input, such as a URL, an image or binary data field, or option fields to specify choices, such as a poll choice.

The electronic form 100 can be used to initiate a variety of zaplets for different applications, which are herein referred to as "zaplet processes". Once the electronic form 100 is created, it is sent to the server 6. The server 6 then sends an e-mail message to the participants listed in the network address field 103 to notify the receiving participants that a zaplet process has been initiated. The e-mail message is opened and parsed, and the zaplet is essentially immediately accessed from the server 6 as described below.

Figure 4:
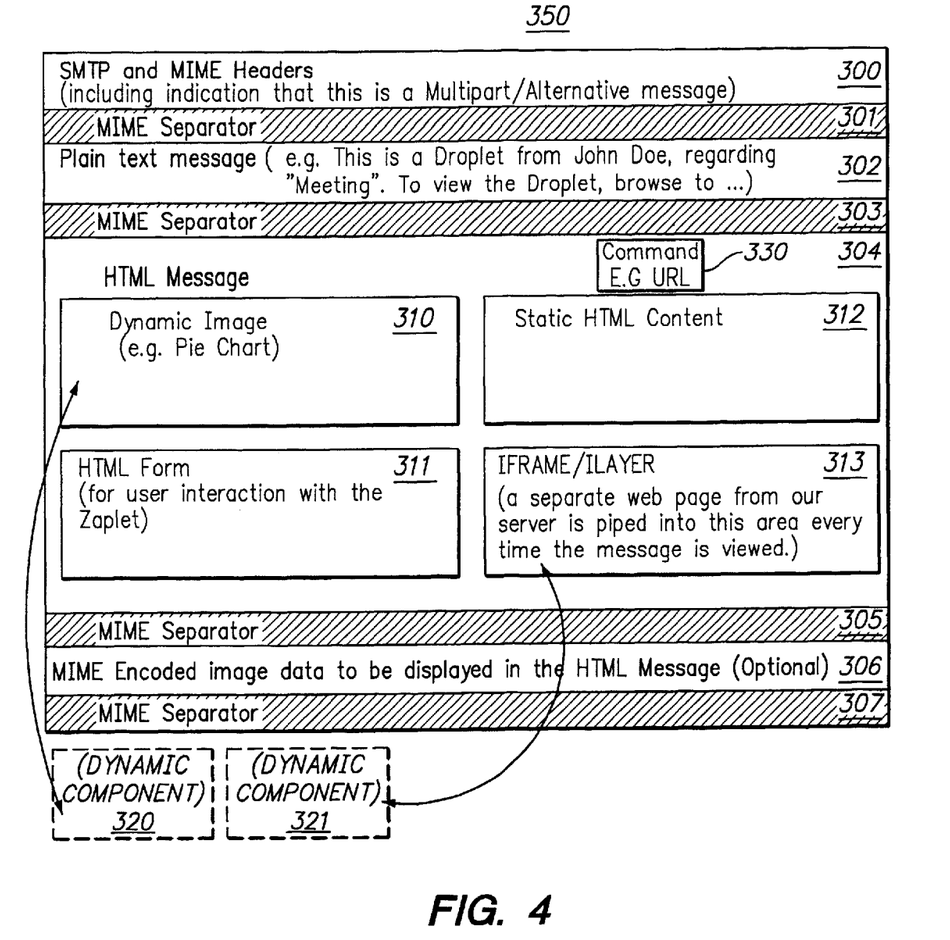
FIG. 4 is a diagram of a data structure for the zaplet having dynamic content.

FIG. 4 shows a suitable data structure for a zaplet process in accordance with the invention.

The data structure 350 can be based, for example, on HTML over SMTP using MIME. The data structure 200 includes SMTP and MIME headers 300. These headers 300 include an indication that the message is a multipart/alternative type according to the MIME standard. The multipart/alternative type specifies that the participant is configured to display one alternative format or content-type of the message selected from a segment 302 and a segment 304, depending on the capability of the software of the participant parsing the message.

The data structure 350 may define a transport envelope with region 300 containing a plurality of network addresses, such as the e-mail address of a sending and receiving participant.

A MIME separator 301 may be inserted between headers 300 and segments 302 and also between segments 302 and 304.

The segment 302 may also include a plain text message that is displayed if the participant does not have the capability to display regions 310 and 313 of segment 304, described below, according to the multipart/alterative message type indicated in the headers 300. For example, the segment 302 can include a command instructing a participant that he or she may view a web page corresponding to the segment 304.

The segment 304 may include a rich text HTML document, including any number of dynamic regions 310, HTML forms 311, static HTML content regions 312, and IFRAME/ILAYER regions 313. The dynamic content region 310 can include a command to dynamic content 320 of the zaplet, stored remotely such as in the database 10 of the server 6 on the network 5. The IFRAME/ILAYER region 313 may include a command to access dynamic content 321 of the zaplet, stored remotely such as in the database 10 or at the server 6 on the network 5. The dynamic content 321 may be in the same location as the first dynamic content 320, or may be in a different location in database 10. Each dynamic content region 310 and 313 may have content that includes more than one dynamically updated construct or image.

The form 311 can be used to receive input from a participant, and the region 312 can be used to provide static information/processes that are independent of the current zaplet process.

The segment 304 may also include a region 330 that can be used to store a command indicating a web page storing the content of the segment 304. This configuration can be used when a participant attempts to forward the zaplet to another participant connected to a server that cannot support the segment 304. In this way, the participant can still view the content of segment 304, and is therefore not dropped from the group.

In FIG. 4, a MIME separator 305 is configured between the segment 304 and a segment 306.

The segment 306 can include MIME encoded image data to be displayed in the HTML message of segment 304. The image data may include images for logos or photos that can be accessed by the participant even if the server 6 is not accessible. The optional segment 306 is followed by a MIME separator 307.

The present inventors have discovered that the structure 350 can be used to provide a high quality of service to various classes of participants based upon their e-mail client application capabilities. Five classes of "e-mail clients" include new P.C. e-mail clients, web e-mail clients, older P.C. e-mail clients, text e-mail clients, and America On-Line ("AOL") e-mail clients. The functionality in the segment 304 is provided to new P.C. e-mail clients completely. Some web e-mail clients do not allow use of an IFRAME/ILAYER tag to display dynamic content 321 of the dynamic content region 313. In this case, the participant gets a static message directing the participant to a web representation, or a dynamic image displaying the same up-to-date data is served by the image server 28. Many older P.C. e-mail clients, and all of the text e-mail clients cannot display the segment 304. These participants may receive an e-mail message with static content, and a URL identifying a web page at which the dynamic content may be accessed. Current AOL clients support some of the HTML standard.

It has also been found that the server 6 can be configured to identify the capability of a participant. For example, the server 6 can be configured to automatically send the zaplet to the participant by recognizing the suffix "aol.com" in the participant's network address. Alternatively, the participant can specify which e-mail client to use by sending a request to the server 6.

Figure 5:
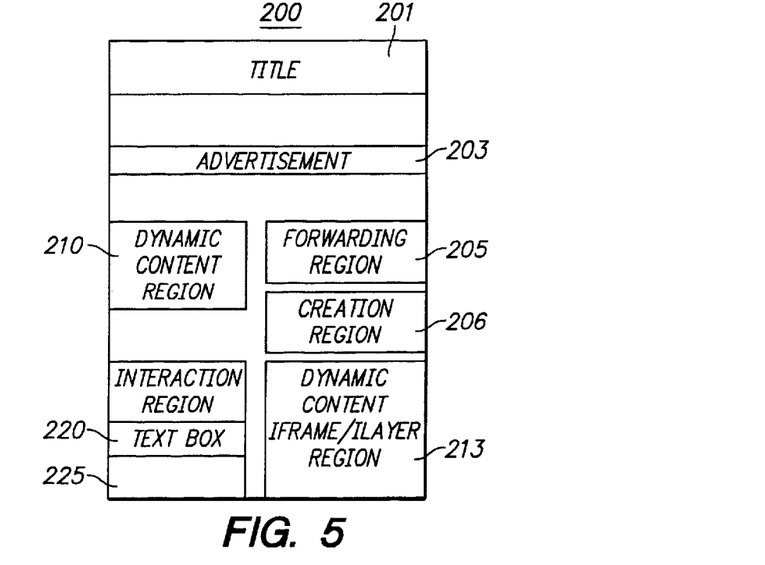
FIG. 5 is an example of an image of a zaplet.

FIG. 5 shows an example of an image of a zaplet 200 that is displayed to a user when the data structure 350 is parsed. The zaplet may include a title field 201 that contains static content similar to the information inputted in fields 101, 102, 104, and 105. Preferably, the above static content is displayed each time the zaplet 200 is accessed by a participant. The zaplet 200 may also include an advertising region 203. The content in region 203 can be static or dynamic content. The content in regions 201 and 203 can be configured and supplied by the business logic in web application server 14.

The zaplet 200 also includes a forwarding region 205 and a creation region 206 corresponding to segment 312 of the data structure 350. The region 205 allows a participant to add an address of a potential participant that is not listed in the address field 103. This means that any participant listed in the address list of field 103 can include any other potential participants not listed in the field 103. In other configurations, the ability of a participant to add another participant can be controlled by the creating participant of the zaplet.

The creation region 206 is also included in zaplet 200 to allow a participant to create an electronic form similar to electronic form 100 to initiate another zaplet process.

The zaplet 200 also includes a dynamic content region 210 corresponding to segment 310 of data structure 350 that receives the dynamic content 320. In one configuration, region 210 may include a graphical image, such as a pie chart, or other binary content including executable content. The content 320 of the region 210 can be dynamically updated by the business logic residing in the web application server 14.

The zaplet 200 also includes an interaction region 225 corresponding to segment 312 of the data structure 350. The interaction region can include images, such as check boxes, to select options created using the electronic form 100. For example, a poll can be, initiated in electronic form 100 and the interaction region 225 could contain boxes to select a poll choice. The interaction region also contains a text box 223 that allows a participant to add a text passage to the zaplet. The interaction region may also include the name of the responding participant and his or her associated e-mail address.

A dynamic content region 213 corresponding to region 313 of data structure 350 is contained in zaplet 200 that receives the content 321. The content 321 can include text passages that are entered by participants using the interaction region 225. The business logic at the web application server 14 manages the text passages and causes changes to the variables in database 10 to update the content 321 and to display the updated content in region 213, when the participant opens the message. The displayed content in region 213 may include visual images, a list of participants who have entered text passages, or any other relevant dynamic content.

Figure 6:
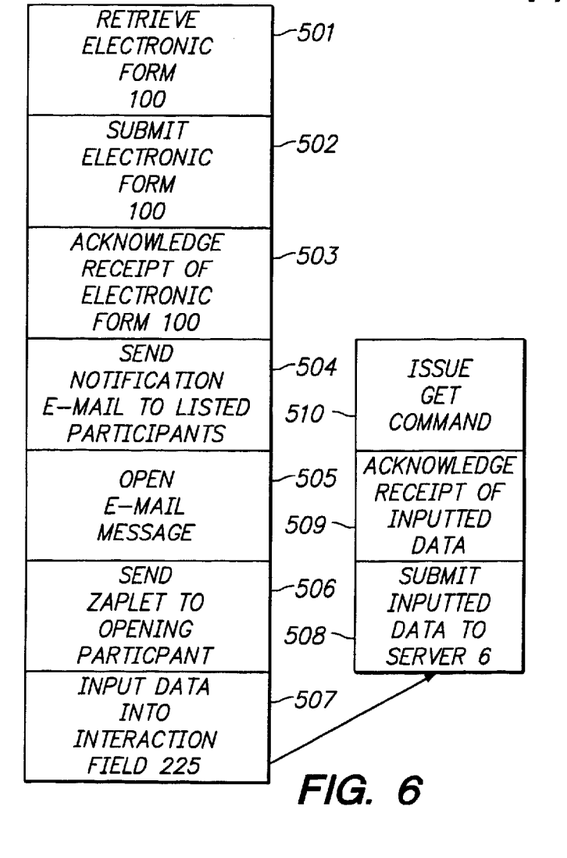
FIG. 6 is a flow chart illustrating a preferred method of the present invention.

FIG. 6 is a flow chart of a preferred method of the invention. Initially, one of the participants accesses a live electronic form 100 to begin a zaplet process (step 501). The requesting participant may access the form 100 from the database 10 via the web server 16, from a web site, or other resource as discussed above. To access the electronic form 100, the participant may specify a descriptor, such as a URL, associated with the electronic form 100. Once the electronic form 100 is displayed to the participant, the participant completes the fields 101, 102, 103, and 104. The participant may also complete field 105. The participant then submits the form to the server 6 (step 502).

Next, a confirmation message is sent from the web server 16 indicating that the content of the electronic form 100 was received, that the electronic form 100 was sent to the addresses listed in field 103, and any other errors associated with the processing of the electronic form 100 (step 503). Alternatively, the creating participant of the electronic form 100 may receive the e-mail message (step 504) described below as an acknowledgement that the form 100 was successfully received by the server 6.

Each of the participants in the list in field 103 receives an e-mail message associated with the zaplet (step 504) indicating that the zaplet process has been initiated. Next, a receiving participant opens the message (step 505). In one configuration, a receiving participant may be the creating participant. This mechanism could allow a creating participant to create a "personal" zaplet that only he or she could update or retrieve. Once the receiving participant opens the e-mail message, the dynamic content of the zaplet 200 is served essentially at viewing time to the display of the participant as follows (step 506).

Figure 7:
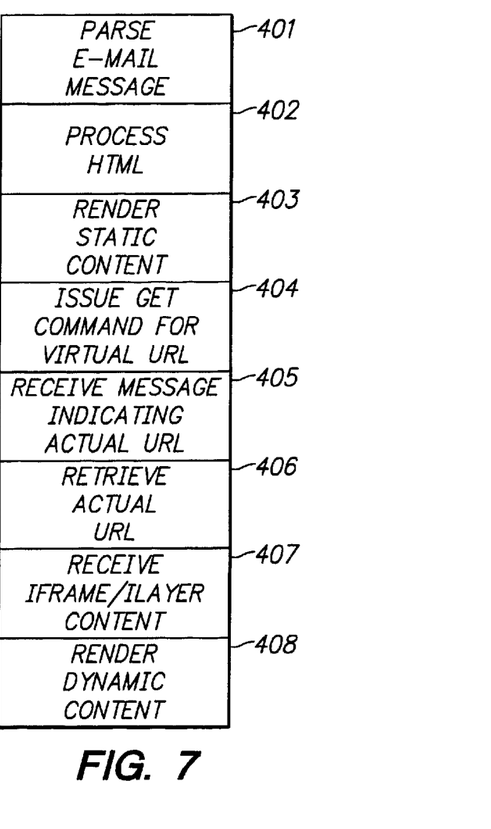
FIG. 7 is a flow chart illustrating a preferred method of accessing the zaplet by parsing the data structure of FIG. 4.

Referring to FIG. 7, the e-mail protocol residing at the participant begins by parsing the received e-mail according to the MIME and SMTP header and separators 300 (step 401). If the participant is capable of displaying the dynamic content of the zaplet in the segment 304, content is produced by parsing the HTML (step 402). The participant initially renders static components of the zaplet, such as in the regions 311 and 312 (step 403). To render the dynamic content in region 310, a parsing engine at the participant issues a get command using, for example, a virtual URL identified by a tag field in the HTML (step 404). The server 6 includes logic, such as business logic in web application server 14, to map the virtual URL to an actual URL for the dynamic content 320 of the dynamic content region 310, and returns a message indicating the actual URL for the dynamic content 320 corresponding to the virtual URL, which is received at the participant site (step 405). A get command for the actual URL is then issued (step 406). A web page indicated by the IFRAME/ILAYER region 313 of the data structure 350 can also be retrieved similar to steps 404–406 (step 407), and then the dynamic content 321 for the dynamic content region 313 is rendered (step 408).

Referring again to FIG. 6, once the zaplet 200 is retrieved by the participant, he or she inputs data into the interaction region 225 (step 507). For example, the user may input a text passage. At this stage, the dynamic content region 213 will include concatenated text messages and a list of message recipients as discussed above. The participant then submits the updated zaplet to the server 6 (step 508). Next, the submitting participant receives an acknowledgement from the web server 16 indicating that the zaplet was received (step 509). The e-mail protocol residing at the client may then issue at any time a new get command for the dynamic content in region 310 and/or region 313 to display the updated images and/or text content in the dynamic content regions 210 and 213 (step 510). Alternatively, after the participant submits his or her input (step 508), another instance of the zaplet could be served that includes the above acknowledgement, and also reflects the most recent dynamic content including the submission at step 508. In another configuration, the dynamic content of the zaplet could be updated "in-place". This means that the regions 210 and 213 could be updated to reflect the most recent content in the server 6 including the submission at step 508, as the participant is viewing the zaplet. Subsequent actions by any of the participants of the group to open a message will result in the display of the updated images and text content in the zaplet 200.

The preferred method permits participants to collaborate efficiently. Each participant can send and receive information that is current using dynamic regions 210 and 213. This means that participants can accurately respond or opine to a zaplet process with the most current information at their disposal.

The preferred method supports privacy and communications because the dynamic content can be restricted to those specified in field 103. Further, the preferred method and system allows content to be dynamically updated asynchronously relative to the sending of the documents or forms and asynchronously relative to any processes used by any other participants parsing the electronic messages. In this way, the zaplets received by participants of the group do not become stale or outdated. Additionally, the updated content includes dynamic information identifying changes that have occurred since the message was last viewed by the viewing participant. This means that the viewing participant can track the opinions, suggestions, or other comments made by other participants in a simple and quick manner. The preferred method also allows participants to interact with other participants in a group without the daunting task of "surfing" the Web to find the discussion management tool that manages the discussion. The preferred method and system also provides the highest quality service based upon the participant's e-mail application capabilities.

The methods and mechanisms described here are not limited to any particular hardware or software configuration, or to any particular communications modality, but rather they may find applicability in any communications or computer network environment.

The techniques described here may be implemented in hardware or software, or a combination of the two. Preferably, the techniques are implemented in computer programs executing one or more programmable computers that each includes a processor, a storage medium readable by the processor (including volatile and non-volatile memory and/or storage elements), and suitable input and output devices. The programmable computers may be either general-purpose computers or special-purpose, embedded systems. In either case, program code is applied to data entered with or received from an input device to perform the functions described and to generate output information. The output information is applied to one or more output devices.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk, magnetic diskette, or memory chip) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

A number of embodiments of the present invention have been described. Nevertheless, it will be understood that various modifications may be made without departing from the spirit and scope of the invention. For example, variations in the specification of which e-mail protocol a particular participant supports can be sent by the participant to the server 6 so that a different message format based on that knowledge can be forwarded to the participant. Accordingly, other embodiments are within the scope of the following claims.

APPENDIX A

```
1 Deliver Electronic (Authoring) Form
get ZAPLET_TYPE, ZAPLET_STYLE from request
open file ELECTRONIC_FORM for writing
write Creating_Participant_Input_Field(ZAPLET_TYPE, ZAPLET_STYLE) to
ELECTRONIC_FORM
write Creating_Participant_Email_Input_Field(ZAPLET_TYPE, ZAPLET_STYLE) to
ELECTRONIC_FORM
write Subject_Input_Field(ZAPLET_TYPE, ZAPLET_STYLE) to ELECTRONIC_FORM
write Recipients_Input_Field(ZAPLET_TYPE, ZAPLET_STYLE) to
ELECTRONIC_FORM
write Zaplet_Specific_Data_Input_Fields(ZAPLET_TYPE, ZAPLET_STYLE) to
ELECTRONIC_FORM
write Zaplet_Type_Constant(ZAPLET_TYPE, ZAPLET_STYLE) to
ELECTRONIC_FORM
write Zaplet_Style_Constant(ZAPLET_TYPE, ZAPLET_STYLE) to
ELECTRONIC_FORM
write Static_Form_Content(ZAPLET_TYPE, ZAPLET_STYLE) to ELECTRONIC_FORM
open stream CLIENT for writing
write ELECTRONIC_FORM to CLIENT
2 Receive Electronic (Authoring) Form Input and Send Mail
get CREATING_PARTICIPANT_NAME, CREATING_PARTICIPANT_EMAIL,
SUBJECT,
ZAPLET_TYPE,
        ZAPLET_STYLE, ZAPLET_SPECIFIC_DATA, RECIPIENTS from request
set MESSAGE_ID = create_unique_id( )
open file MESSAGE for writing
create (Message_Record(MESSAGE_ID, CREATING_PARTICIPANT_NAME,
CREATING_PARTICIPANT_EMAIL,
        SUBJECT, ZAPLET_TYPE, ZAPLET_STYLE, ZAPLET_SPECIFIC_DATA,
RECIPIENTS)) in
database
write MESSAGE_ID, CREATING_PARTICIPANT_NAME,
CREATING_PARTICIPANT_EMAIL,
        SUBJECT, ZAPLET_TYPE, ZAPLET_STYLE, ZAPLET_SPECIFIC_DATA,
RECIPIENTS to
MESSAGE
if (User_Record(CREATING_PARTICIPANT_EMAIL) not_exists_in database){
        create User_Record(CREATING_PARTICIPANT_EMAIL,
CREATING_PARTICIPANT_NAME)
in database
}
foreach (USER_EMAIL in RECIPIENTS){
        if (User_Record(USER_EMAIL) not_exists_in database){
                create User_Record(USER_EMAIL) in database
        }
}
foreach (QUESTION in request) {
        set QUESTION_ID = create_unique_id( )
        get QUESTION_CONTENT from request
        write QUESTION_ID, QUESTION_CONTENT to MESSAGE in database
        foreach (CHOICE in QUESTION) {
                set CHOICE_ID = create_unique_id( )
                write CHOICE_ID, CHOICE to MESSAGE
        }
}
open file MAIL for writing
write (Transport_Headers(MESSAGE)) to MAIL
write ("From:" + Creating_Participant(MESSAGE)) to MAIL
write ("To:" + Recipients(MESSAGE)) to MAIL
write ("Subject:" + Subject(MESSAGE)) to MAIL
```

APPENDIX A-continued

```
write (Encoding_Headers(MESSAGE)) to MAIL
write (ENCODING_SEPARATOR) to MAIL
write (PLAIN_TEXT_ENCODING_LABEL) to MAIL
write (Plain_Text_Static_Portion(MESSAGE)) to MAIL
write (URL(MESSAGE)) to MAIL
write (ENCODING_SEPARATOR) to MAIL
write (RICH_TEXT_ENCODING_LABEL) to MAIL
write (Rich_Text_Static_Portion(MESSAGE)) to MAIL
foreach (QUESTION in MESSAGE) {
        write (Interaction_Form(QUESTION)) to MAIL
        write (Static_Portion(QUESTION)) to MAIL
        write (Dynamic_Image_Portion(QUESTION)) to MAIL
        write (IFRAME_ILAYER_Portion(QUESTION)) to MAIL
        write (IFRAME_ILAYER_Alternative_Portion(QUESTION)) to MAIL
}
write (ENCODING_SEPARATOR) to MAIL
if (SUPPORT_IMAGE_DATA)
        write (Image_Data(MESSAGE)) to MAIL
open stream TRANSPORT_SERVER for writing
write MAIL to TRANSPORT_SERVER
open file REPLY for writing
write Confirmation_Message(MAIL) to REPLY
open stream CLIENT for writing
write REPLY to CLIENT
3 Serve Dynamic Rich-Text Contents
get MESSAGE_ID from request
load MESSAGE by MESSAGE_ID from database
open file REPLY for writing
foreach (QUESTION in MESSAGE) {
        write (Format_Dynamic_Portion(QUESTION)) to REPLY
        foreach (RESPONSE in QUESTION){
                write (Format_Dynamic_Portion(RESPONSE)) to REPLY
        }
}
open stream CLIENT for writing
write REPLY to CLIENT
4 Serve Dynamic Image Contents
get MESSAGE_ID, QUESTION_ID from request
load QUESTION by QUESTION_ID from database
open file IMAGE for writing
write (Format_Image(QUESTION, Summarize(Responses(QUESTION)))) to IMAGE
open stream CLIENT for writing
write IMAGE to CLIENT
5 Receive Response Form Input
get MESSAGE_ID, QUESTION_ID, RESPONDER_NAME, RESPONDER_EMAIL,
COMMENT,
        QUESTION_SPECIFIC_INFO from request
if (User_Record(RESPONDER_EMAIL) not_exists_in database){
        create User_Record(RESPONDER_EMAIL, RESPONDER_NAME) in database
}
if (Allowed_To_Respond(RESPONDER_EMAIL, QUESTION){
        create_or_update Response_Record(MESSAGE_ID, QUESTION_ID,
RESPONDER_EMAIL,
COMMENT, QUESTION_SPECIFIC_INFO) in database
}
open file REPLY for writing
get MESSAGE by MESSAGE_ID from database
write (Confirmation_View(MESSAGE)) to REPLY
open stream CLIENT for writing
write REPLY to CLIENT
6 Resend or Forward Message
get MESSAGE_ID, NEW_RECIPIENT_EMAILS from request
foreach (USER_EMAIL in NEW_RECIPIENT_EMAILS){
        if (User_Record(USER_EMAIL) not_exists_in database){
                create User_Record(USER_EMAIL) in database
        }
}
get MESSAGE by MESSAGE_ID from database
set Recipients(MESSAGE) = Recipients(MESSAGE)+NEW_RECIPIENT_EMAILS
update Message_Record(MESSAGE) in database
open file MAIL for writing
write (Transport_Headers(MESSAGE)) to MAIL
write ("From:" + Creating_Participant(MESSAGE)) to MAIL
write ("To:" + NEW_RECIPIENT_EMAILS) to MAIL
write ("Subject:" + Subject(MESSAGE)) to MAIL
write (Encoding_Headers(MESSAGE)) to MAIL
write (ENCODING_SEPARATOR) to MAIL
write (PLAIN_TEXT_ENCODING_LABEL) to MAIL
write (Plain_Text_Static_Portion(MESSAGE)) to MAIL
```

APPENDIX A-continued

```
write (URL(MESSAGE)) to MAIL
write (ENCODING_SEPARATOR) to MAIL
write (RICH_TEXT_ENCODING_LABEL) to MAIL
write (Rich_Text_Static_Portion(MESSAGE)) to MAIL
foreach (QUESTION in MESSAGE) {
        write (Interaction_Form(QUESTION)) to MAIL
        write (Static_Portion(QUESTION)) to MAIL
        write (Dynamic_Image_Portion(QUESTION)) to MAIL
        write (IFRAME_ILAYER_Portion(QUESTION)) to MAIL
        write (IFRAME_ILAYER_Alternative_Portion(QUESTION)) to MAIL
}
write (ENCODING_SEPARATOR) to MAIL
if (SUPPORT_IMAGE_DATA)
        write (Image_Data(MESSAGE)) to MAIL
open stream TRANSPORT_SERVER for writing
write MAIL to TRANSPORT_SERVER
open file REPLY for writing
write Confirmation_Message(MAIL) to REPLY
open stream CLIENT for writing
write REPLY to CLIENT
```

What is claimed is:

1. A network system for communicating information among participants of a group, comprising:

a server having an associated database and adapted to be used in the network, means in the server for generating and sending an electronic message to selected participants, means in the server for generating an electronic medium stored in the database and associated with the electronic message in response to a first open action of the electronic message by at least one of selected participants, the electronic medium containing dynamic content and all then-current updates received at the server from any other participants;

an interface in the electronic medium for communicating input from the selected participants to the electronic medium in the server; and logic in communicating with the database to asynchronously dynamically update the electronic medium in the database in response to said input and to dynamically retrieve the dynamic content of the electronic medium stored in the database including all then-current updates in response to one of the input from the selected participants and an external source in data communication with the server.

2. The network system of claim 1, wherein the database comprises a plurality of variables associated with one of each of the participants, the electronic message, and the electronic medium.

3. The network system of claim 1, wherein the server is configured to support a plurality of electronic mail protocols.

4. The network system of claim 3, wherein the plurality of electronic mail protocols comprise one of SMTP and MIME.

5. The network system of claim 1, wherein the server is configured to support a plurality of image construction languages, wherein the plurality of image construction languages comprise both HTML and XML.

6. The network system of claim 1, wherein at least one of the participants and the server is configured to execute the first open action.

7. The network system of claim 1, wherein the electronic medium is parsed to access the dynamic content.

8. The network system of claim 1, wherein the logic comprises a plurality of executable steps to concatenate the dynamic content.

9. The network system of claim 1, wherein the server is configured to send a then current content of the electronic medium from the database in response to a second open action.

10. The network system of claim 1, wherein the database comprises a plurality of electronic forms, the electronic forms being configured to initiate the generation of the electronic message.

11. The network system of claim 10, wherein each of the electronic forms comprise a region for entering a plurality of network addresses corresponding to the participants of the group.

12. The network system of claim 1, wherein the interface includes a plurality of options, the dynamic content being updated in the database to indicate a selection of one of the options in the interface.

13. The network system of claim 1, wherein the server is configured to cause display of the updated dynamic content including all then-current updates in response to parsing of the electronic message after the dynamic content is updated by the logic.

14. The network system of claim 1, the server is configured to enable display of the updated dynamic content using a virtual image identifier, and including logic which maps the virtual image identifier to the dynamic content in the server.

15. The network system of claim 1, wherein the server is configured to enable display of the updated dynamic content using a tag associated with a universal resource locator of a web page stored in the server.

16. The network system of claim 15, wherein the tag comprises one of an IFRAME and an ILAYER tag.

17. The network system of claim 1, wherein the server accepts text input from an external source in data communication with the server.

18. The network system of claim 17, wherein the dynamic content is updated in response to the text input from the external source.

19. The network system of claim 5, wherein the dynamic content is one of video content, audio content, binary content, executable content, text, and images.

20. The network system of claim 1, wherein the dynamic content is dynamically updated and retrieved asynchronously relative to the input from at least one of the selected participants and input from an external source in data communication with the server.

21. The network system of claim 1, wherein the updated dynamic content is current when retrieved.

22. The network system of claim 1, wherein electronic message includes a code to identify a plurality of content-types.

23. The network system of claim 22, wherein the dynamic content is retrieved for display to selected ones of the identified plurality of content-types.

24. The network system of claim 22, wherein a plain text message is displayed when one of the plurality of content-types cannot support the dynamic content.

25. A network system including a plurality of client terminals, comprising:
   at least one data processing machine located at each of the client terminals; and
   computer software, residing on a computer readable medium at each machine to cause the machine to perform the following operations:
      parsing an electronic message in response to an open action;
      receiving an electronic medium from a server and associated with the electronic message, the electronic medium containing dynamic content and all then-current updates received at the server from any of the client terminals;
      submitting input entered into an interface of the electronic medium from a user of one of the client terminals to the electronic medium in the server, the server asynchronously dynamically updating the dynamic content of the electronic medium in response to said input to reflect the input from the user.

26. A network system for communicating information among participants of a group, comprising:
   a server adapted to be used in the network, the server having an associated database, and the server generating an electronic medium from the database and associated with an electronic message directed to the participants in the group in response to a first open action of the electronic message by at least one of the participants, the electronic medium containing dynamic content and all then-current updates received at the server from any other participants;
   an interface in the electronic medium for communicating input from the participants to the electronic medium in the server; and
   logic in communicating with the database to asynchronously dynamically update the electronic medium in the database in response to said input and to dynamically retrieve the dynamic content of the electronic medium stored in the database including all then-current updates in response to one of the input from the participants, the dynamic content being current when retrieved.

27. An apparatus for communicating information among participants of a group, comprising:
   a data store comprising one or more stored electronic media, each electronic medium associated with an electronic message, each electronic medium having one or more dynamic content elements associated therewith and stored in the data store;
   a processor that is communicatively coupled to the data store; and
   a memory that is communicatively coupled to the data store and comprising one or more sequences of instructions which, when executed by the processor, cause the processor to carry out the steps of:
      generating and sending a first electronic message to one or more selected participants among the group;
      receiving at a server separate from the participants, from one or more of the selected participants, one or more updates to a first electronic medium that is associated with the first electronic message;
      updating one or more of the dynamic content elements of the first electronic medium based on the one or more updates;
      receiving information specifying an open action for the first electronic message from any other participant among the selected participants; and
      providing the dynamic content elements of the electronic medium, including all then-current updates, to the other participant for display in association with the first electronic message.

28. An apparatus as recited in claim 27, wherein the data store further comprises one or more electronic forms, wherein each of the electronic forms is configured to initiate generation of the first electronic message when such electronic forms are accessed by one or more of the selected participants.

29. An apparatus as recited in claim 27, wherein the sequences of instructions further comprise instructions which, when executed by the processor, cause the processor to carry out the steps of generating, as part of the electronic medium, a virtual image identifier, and one or more instructions that map the virtual image identifier to the dynamic content.

30. An apparatus as recited in claim 27, wherein the sequences of instructions further comprise instructions which, when executed by the processor, cause the processor to carry out the steps of generating, as part of the electronic medium, a tag associated with a universal resource locator that identifies a location of the dynamic content.

31. An apparatus as recited in claim 30, wherein the tag comprises an IFRAME tag or an ILAYER tag.

32. An apparatus as recited in claim 27, wherein the sequences of instructions further comprise instructions which, when executed by the processor, cause the processor to carry out the steps of:
   asynchronously receiving one or more second updates from a data source that is external to the data store and the processor;
   dynamically updating one of the dynamic content elements of the first electronic message based on the one or more second updates.

33. An apparatus as recited in claim 27, wherein each electronic message further comprises one or more static content regions that define associated static content stored in the data store.

34. An apparatus as recited in claim 27, wherein the step of receiving information specifying an open action comprises the step of receiving a request from an electronic mail client application program requesting to open the electronic message.

35. An apparatus as recited in claim 27, wherein each electronic medium comprises one or more instructions in hypertext markup language (HTML).

36. An apparatus as recited in claim 27, wherein each electronic medium comprises a name field that identifies network addresses of the selected participants; a subject field that identifies a subject of the electronic medium; a plurality of static content elements; and a plurality of dynamic content elements.

37. An apparatus as recited in claim 27, wherein each electronic message comprises a transport envelope, a plurality of static content regions; a plurality of dynamic content regions; and a plurality of MIME elements that delimit the static content regions and dynamic content regions.

38. An apparatus as recited in claim 37, wherein each dynamic content region is defined by an IFRAME HTML tag or an ILAYER HTML tag.

39. An apparatus as recited in claim 27, wherein the processor is communicatively coupled to a network, the apparatus further comprising:

a second processor that is communicatively coupled to the network and associated with one of the selected participants; and     a second memory that is communicatively coupled to the second processor and comprising one or more second sequences of instructions which, when executed by the processor, cause the processor to carry out the steps of:

receiving the first electronic message as an HTML electronic mail message;

parsing and displaying one or more static content elements of the electronic mail message;

issuing one or more HTTP GET requests to retrieve the dynamic content elements of the electronic medium that is associated with the first electronic message from the data store, including all then-current updates;

providing the dynamic content elements and then-current updates to the other participant for display in association with the first electronic message.

40. An apparatus for communicating information among participants of a group, comprising:

means for storing one or more electronic media, each electronic medium associated with an associated electronic message, each electronic medium having one or more dynamic content elements associated therewith and stored in the data store;

means communicatively coupled to the data store for generating and sending a first electronic message to one or more selected participants among the group;

means for receiving at a server separate from the participants, from one or more of the selected participants, one or more updates to a first electronic medium that is associated with the first electronic message;

means for updating one or more of the dynamic content elements of the first electronic medium based on the one or more updates;

means for receiving information specifying an open action for the first electronic message from any other participant among the selected participants; and     means for providing the dynamic content elements of the electronic medium, including all then-current updates, to the other participant for display in association with the first electronic message.

41. A data processing server, comprising:

a processor that is communicatively coupled to a data store comprising one or more stored electronic media, each electronic medium associated with an electronic message, each electronic medium having one or more dynamic content elements associated therewith and stored in the data store;

a computer-readable medium that is communicatively coupled to the processor and comprising one or more sequences of instructions which, when executed by the processor, cause the processor to carry out the steps of:

generating and sending a first electronic message to one or more selected participants in a group, wherein the participants comprise users, clients, external computer systems, or external computer processes;

receiving at a server separate from the participants, from one or more of the selected participants, one or more updates to a first electronic medium that is associated with the first electronic message;

updating one or more of the dynamic content elements of the first electronic medium based on the one or more updates;

receiving information specifying an open action for the first electronic message from any other participant among the selected participants; and         providing the dynamic content elements of the electronic medium, including all then-current updates, to the other participant for display in association with the first electronic message.

42. A server as recited in claim 41, wherein the data store comprises a database, wherein each electronic medium is stored in a record of a table of the database, and wherein each dynamic content element of an electronic medium comprises a column object in the table of the database.

43. A server as recited in claim 41, wherein the data store comprises a database, wherein each electronic medium is stored in a record of a table of the database, and wherein dynamic content elements of a particular electronic medium comprise one or more images and one or more Web pages that are stored in the database.

44. A server as recited in claim 41, wherein the data store comprises a database, wherein each electronic medium is stored in a record of a table of the database, and wherein each record of the table comprises a message identifier value, a creating participant name value, a creating participant address value, a subject value, an electronic medium type value, an electronic medium style value, and one or more dynamic content elements of the electronic medium.

* * * * *